United States Patent [19]
Niles et al.

[11] Patent Number: 6,053,346
[45] Date of Patent: Apr. 25, 2000

[54] REUSABLE ONE-PIECE STORAGE AND SHIPPING CONTAINER

[75] Inventors: Gerald J. Niles, Oakdale; Paul A. Connors, Eagan; John M. Darst, Oakdale, all of Minn.

[73] Assignee: 3M Innovative Properties Company, St. Paul, Minn.

[21] Appl. No.: 09/093,366

[22] Filed: Jun. 8, 1998

[51] Int. Cl.[7] .................................................. B65D 6/18
[52] U.S. Cl. ................................... 220/62; 220/6; 220/7; 220/4.29; 206/508; 206/307.1; 206/707
[58] Field of Search ................................ 206/307.1, 706, 206/707, 722, 725, 503, 505, 506, 508, 509, 515, 518; 220/6, 7, 1.5, 3.8, 4.02, 4.28, 4.29, 23.2, 23.4, 23.6, 507, 512, 516, 517, 518, 555, 62, 604, 608, 629

[56] References Cited

U.S. PATENT DOCUMENTS

| | | | |
|---|---|---|---|
| 2,459,921 | 1/1949 | Comer | 220/62 |
| 3,148,822 | 9/1964 | Yochum, Jr. | 220/62 |
| 4,003,468 | 1/1977 | Berkman | 206/307.1 |
| 4,482,074 | 11/1984 | Lalley | 220/6 |
| 4,703,853 | 11/1987 | Byrns | 206/387 |
| 4,726,091 | 2/1988 | Joyce | 16/227 |
| 4,773,534 | 9/1988 | DeHeras et al. | |
| 5,054,643 | 10/1991 | Joyce | 220/335 |
| 5,121,838 | 6/1992 | Dickie | 220/62 |
| 5,125,524 | 6/1992 | Hosoda et al. | 220/7 |
| 5,253,756 | 10/1993 | Goekler | 206/307.1 |
| 5,303,823 | 4/1994 | Niles et al. | 206/394 |
| 5,386,163 | 1/1995 | Heilman | 310/51 |
| 5,501,351 | 3/1996 | Niles et al. | 220/4.21 |
| 5,531,953 | 7/1996 | Gelardi | 264/296 |
| 5,551,568 | 9/1996 | Niles et al. | 206/509 |
| 5,582,312 | 12/1996 | Niles et al. | 220/4.21 |
| 5,641,068 | 6/1997 | Warner | 206/523 |
| 5,699,926 | 12/1997 | Jacques et al. | 220/6 |
| 5,738,216 | 4/1998 | Warner | 206/523 |
| 5,738,219 | 4/1998 | Arsena et al. | 206/706 |
| 5,794,796 | 8/1998 | Weisburn | 206/307.1 |

FOREIGN PATENT DOCUMENTS 24 24 722  11/1975  Germany.

OTHER PUBLICATIONS

Patent Abstracts of Japan, vol. 098, No. 010, Aug. 31, 1998 & JP 10 119954A, May 12, 1998.

*Primary Examiner*—Stephen Castellano
*Attorney, Agent, or Firm*—Charles D. Levine

[57] ABSTRACT

A storage container for storing and shipping items is foldable between a flat unformed condition and a second folded formed condition. The container includes a base section, and first and second end sections hinged to respective first and second ends of the base section. First and second cover sections are hinged to respective second ends of the end sections. The container includes a structure to secure differently sized and shaped articles in the same location of the inner surface of the base section. The securing structure includes slots, retention columns, ridges, troughs having various walls forming a trough for securing these articles using a friction fit. The container also includes a device for indicating whether the container has been opened.

14 Claims, 10 Drawing Sheets

REUSABLE ONE-PIECE STORAGE AND SHIPPING CONTAINER

TECHNICAL FIELD

The present invention relates to one-piece, reusable storage and shipping containers. More particularly, the invention relates to one-piece recyclable and reusable storage and shipping containers.

BACKGROUND OF THE INVENTION

In making computers and other electronic devices, it is common for component parts to be manufactured in widely separated geographical locations and shipped to an assembly plant. Many of these components are delicate and must be protected during shipment from, among other hazards, physical shock, dust, humidity, and electrical fields such as may be caused by discharge of static electricity. Typically, storage and shipping containers for such parts are bulky and expensive and are not recyclable or reusable, generating cost for disposal or land fill.

One-piece molded containers for magnetic recording media, such as audio tapes or video tapes, are known. U.S. Pat. No. 4,703,853 describes a blow-molded three section storage case for a video cassette having living hinges that allow the case to open to a flat shape. Each case holds only one cassette. U.S. Pat. Nos. 5,386,163 and 5,531,953 describe a one-piece molded box for storing magnetic media devices in which an integral hinge connects a top portion which forms a cavity in which the device is held. The case cannot fold flat, and can hold only one cassette.

U.S. Pat. No. 4,143,763 describes a multiple piece collapsible container for circuit boards. The container includes polymeric inserts having horizontal ribs to locate and cushion the circuit boards. The container is formed of corrugated cardboard. Japanese Patent Applications (Kokai) 60-162636 and 60-162637 describe a method of injection molding thermoplastic resins to form a foldable, one-piece container for circuit boards. U.S. Pat. No. 5,125,524 describes a collapsible multi-piece container for storing and transporting manufactured articles, such as printed circuit boards. The container has interior horizontal ribs that secure the circuit boards.

Collapsible, reusable multi-piece storage and shipping containers have been described in U.S. Pat. Nos. 5,303,823, 5,501,351, 5,551,568, and 5,582,312, the teachings of which are incorporated herein by reference. The containers are particularly suited for storing and shipping several large rolls of magnetic recording tapes, commonly called pancakes.

A two-piece container currently used for single edge contact (SEC) electronic devices includes a cardboard box having a formed foldable polymeric insert with opposing grooves that hold the SEC devices is manufactured by Rsvp, of Soquel, Calif., under the name "U-Pad." The container is not reusable.

Thermoformed and vacuum formed trays that are placed into a cardboard box produce large amounts of waste with only minimal protection of the product.

Living hinges that snap into an open or closed configuration for use with containers are disclosed in U.S. Pat. Nos. 5,054,643 and 4,726,091.

European Patent Application No. 817,089 describes a processor subsystem for use with a universal computer architecture. The subsystem comprises an SEC cartridge. SEC cartridges are well known and have a well-defined configuration.

SUMMARY OF THE INVENTION

A storage container for storing and shipping items is foldable between at least two conditions, a first flat unformed condition suitable for stacking and shipping empty containers and a second folded formed condition suitable for stacking and shipping loaded containers. The container includes a base section having opposing first and second ends, opposing first and second sides, an inner surface, and an outer surface. First and second end sections are hinged to the respective first and second ends of the base section. Each end section has opposing first and second ends, opposing first and second sides, an inner surface, and an outer surface. The first end of each end section is hinged to the respective first and second ends of the base section. First and second cover sections are hinged to the respective second ends of the end sections. Each cover section has opposing first and second ends, opposing first and second sides, an inner surface and an outer surface. The first end of each cover section is hinged to the second end of the respective end sections and the second end of each cover section is a free end and connects to the other cover section free end when the container is in the second condition and the two cover sections combine to form the cover of the container. A structure, integrally formed as one piece with the inner surface of the base section, secures differently sized and shaped articles; articles having a first size and shape can be stored in the same location of the inner surface of the base section as articles having a second size and shape.

The securing structure includes slots having a set of outer walls forming a trough for receiving the articles having a first size and shape and for securing these articles using a friction fit, and a set of inner walls forming a trough for receiving the articles having a second size and shape and for securing these articles using a friction fit. The first size is larger than the second size.

Each slot has a series of troughs, retention columns, and a ridge, and the slot is symmetrical about all of its central axes. Each slot has two deep troughs, a pair of retention columns located in the deep trough, a shallow trough, a retention column located in the shallow trough, a separation ridge, a retention column located on the separation ridge, and a central trough. Each slot also includes a second shallow trough between the two deep troughs, and retention columns located in the central trough.

Each cover section can have a flap and a recessed portion. The flap of one cover section fits into the recessed portion of the complementary cover section.

When the container is in the second folded condition, the base section, one of the first and second end sections, and the respective cover sections matingly engage when the container is formed by folding each end section at a right angle to the base section, and folding the cover sections at right angles to each end section, closing the container when the interlocking flaps and recessed portions of the cover sections engage each other.

Each of the sections can be formed with a wall extending approximately orthogonally along the opposing first and second sides to form side walls of the container when the container is in the second condition. On each side, the wall on the first end of the base section, the wall on the first end portion, and the wall on the first cover portion combine; and the wall on the second end of the base section, the wall on the second end section, and the wall on the second cover section combine. Each section has an inner surface from which the walls extend and an outer surface and each wall has an inner wall portion and an outer wall portion. The angle of each inner wall portion with the inner surface of its respective section and the angle of the outer wall portion with the outer surface of its respective section differ to prevent frictional locking of containers when containers in the first condition are stacked.

Each wall has a free end and the container includes means for securing the two sections together along respective edges of the container walls to form a seal. The securing means includes a rib formed on the free end of some of the walls and a complementary slot formed on the free end of the other of the walls. Corresponding ribs mate with corresponding slots on respective free ends of the walls when the container is in the second condition.

A stacking device permits containers in the first condition to be interlocked and secured from lateral motion and permits containers in the second condition to be interlocked and secured from lateral motion. The stacking device includes a first positive locking member located on the outer surface of one of the base section and cover sections of the container. A first negative locking member is located at a location on the outer surface of the other of the cover sections and the base section of the container. The first positive locking member and the first negative locking member mate when the container is in the second condition and is stacked base to cover. A second locking member is located on the inner surface of one of the base section and cover sections directly opposite the first locking members such that the second locking member mates with one of the first locking members when the container is in the first condition and is stacked flat, outer surface to inner surface. The second locking member is one of positive and negative and mates with the opposite first locking member.

The container also includes a device for indicating whether the container has been opened. This device includes indentations and holes located on the sides of both the center and cover sections. A panel has a flat outwardly-facing section and an inner section having tabs that engage securely with the indentations. Break-away pins on both ends of the panel engage the holes in the sides of the center and cover sections. Each pin has an enlarged head which passes through a respective hole and cannot be removed through the hole. When the panel is removed, the pins break away from the panel and fall through the holes, indicating that the container was tampered with.

DETAILED DESCRIPTION

The present invention is a one-piece, reusable and recyclable storage and shipping container suited for computer or electronics parts or components such as single edge contact (SEC) cartridges. The storage and shipping container has numerous features and advantages over the current SEC container. It is made of a one-piece construction that lays flat when not in use or for return of empty containers for reuse. The known containers, such as the "U-Pad" container cannot do this because it is a two-piece, cardboard construction that is not reused and would be difficult, at best, to reform after breaking it down into a flat configuration.

The container is formed by blow molding. This allows the interior and exterior features to be designed and formed independently. Blow molding also permits the container to have a hollow double wall construction with "blow-holes" to control impact absorption. When there is an impact on the container, the blow holes act as valves to release the air between the two walls. This loss of air allows the walls to move at a rate equal to the amount of air that can be forced out of the hole and dampens the impact to the container and the stored product.

The container is blow-molded using simple tooling at low cost and is reusable many times. Alternatively, the sections can be made by injection molding, twinsheet thermoforming, and other methods. The sections can be made from high density polyethylene to create strong, lightweight, hollow shells. The sections are formed of substantially a single material so that the storage container 10 is easily recyclable into new containers. Alternatively, a mixture of HDPE and LLDPE can be used to increase life of the container. It is also possible to co-extrude two different density materials. The sheet for the outside of the container can be molded of, for example, a HDPE and the sheet for the inside can be molded of, for example, LLDPE to give better shock protection to the product being shipped. Alternatively, the inside can be HDPE and the outside can be LLDPE. Polyethylene, polypropylene, and other materials that can be blow molded also can be used. Various grades of these materials can be used.

The sections can be lined with an insulating foam such as polyurethane to prevent wide temperature variations within the container 10. The materials can be filled with known antistatic materials and other fillers such as conductive carbon at a loading of from 5% to 20% by weight.

Figure 4:
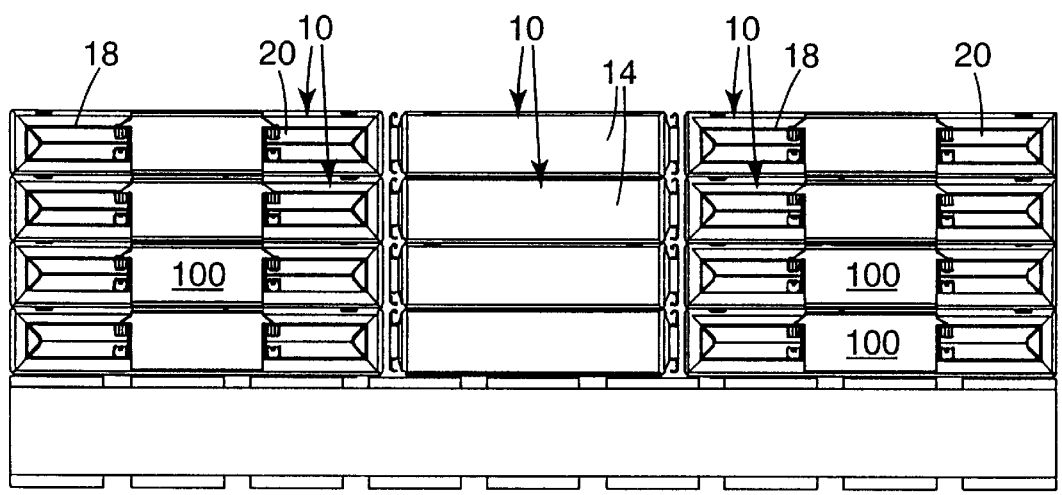
FIG. 4 is a side view of several stacked containers in the second condition.

The container is foldable among three conditions. In a first flat condition shown in FIGS. 1 and 2, the empty container is flat and is suitable for stacking and shipping. The container also can be loaded with articles. In a second folded condition shown in FIGS. 3 and 4, the container is formed and can hold articles. The container is suitable for stacking and shipping loaded with these articles. In a third folded condition shown in FIG. 5, the container is suitable for loading and unloading items from the container. The end and cover sections (described below) are folded underneath the base section.

Figure 1:
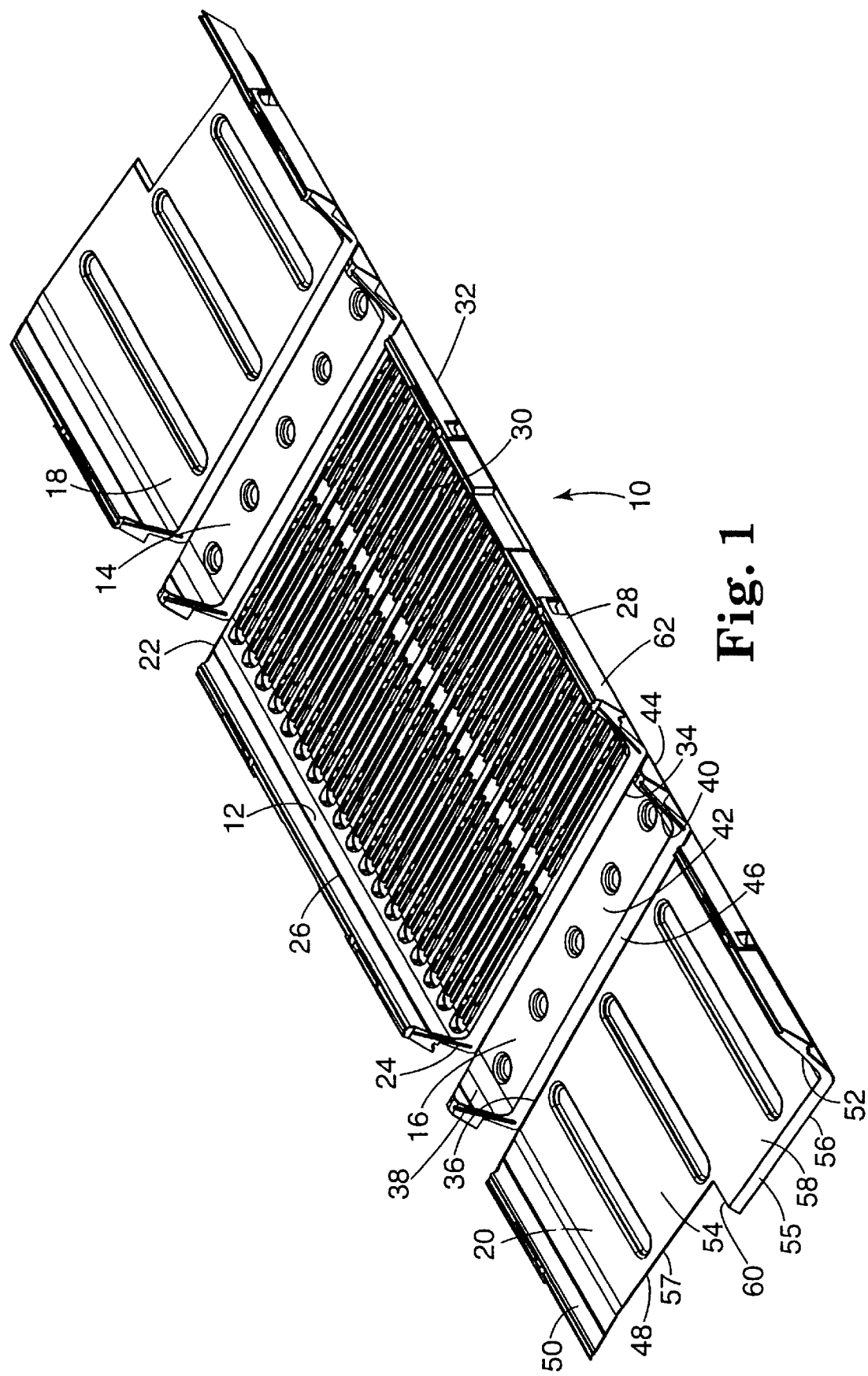
FIG. 1 is a perspective view of a container of the invention in a first condition.
Figure 2:
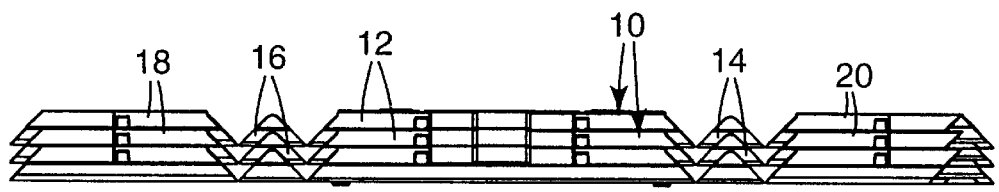
FIG. 2 is a side view of several stacked containers.
Figure 3:
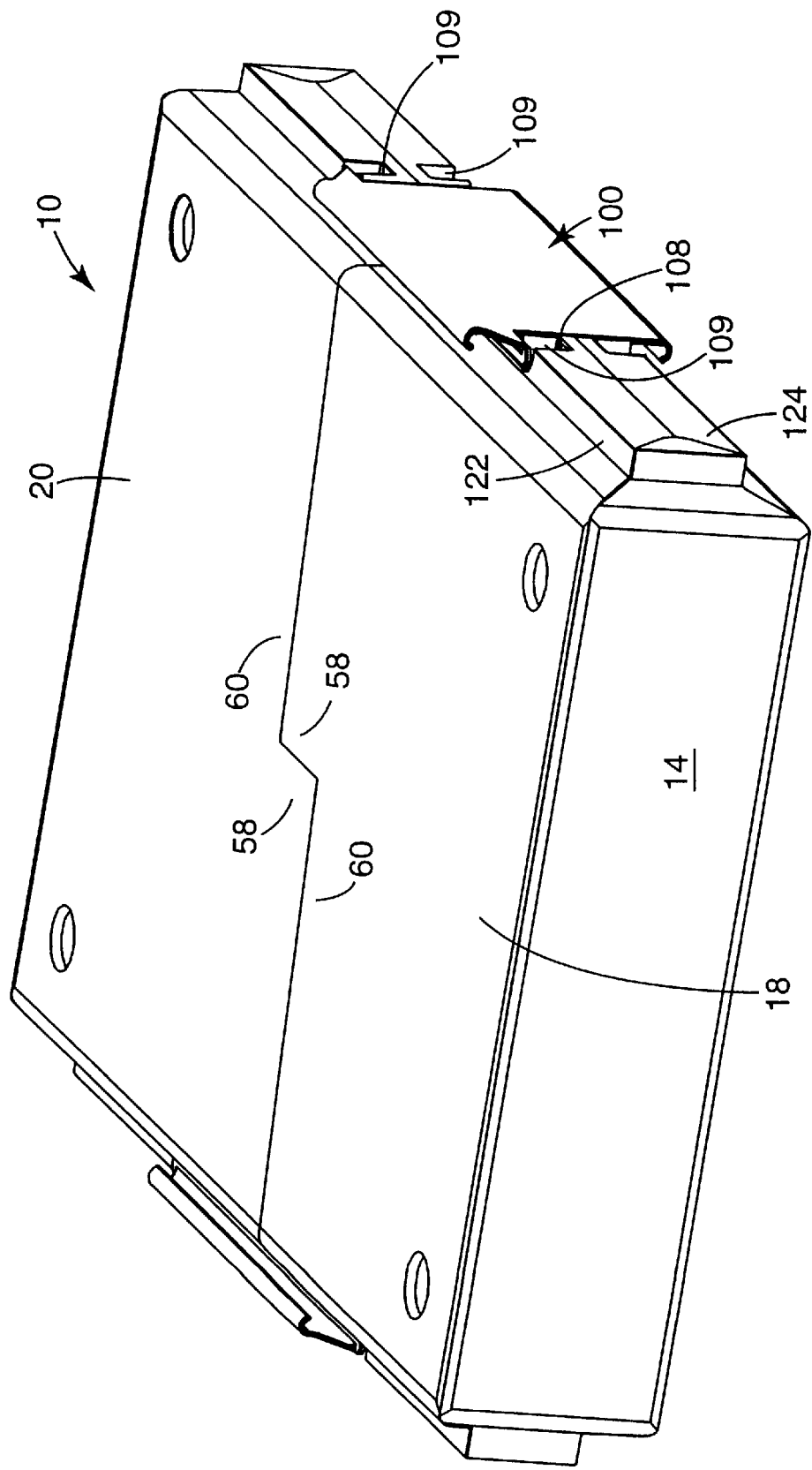
FIG. 3 is a perspective view of the container in a second condition.
Figure 6:
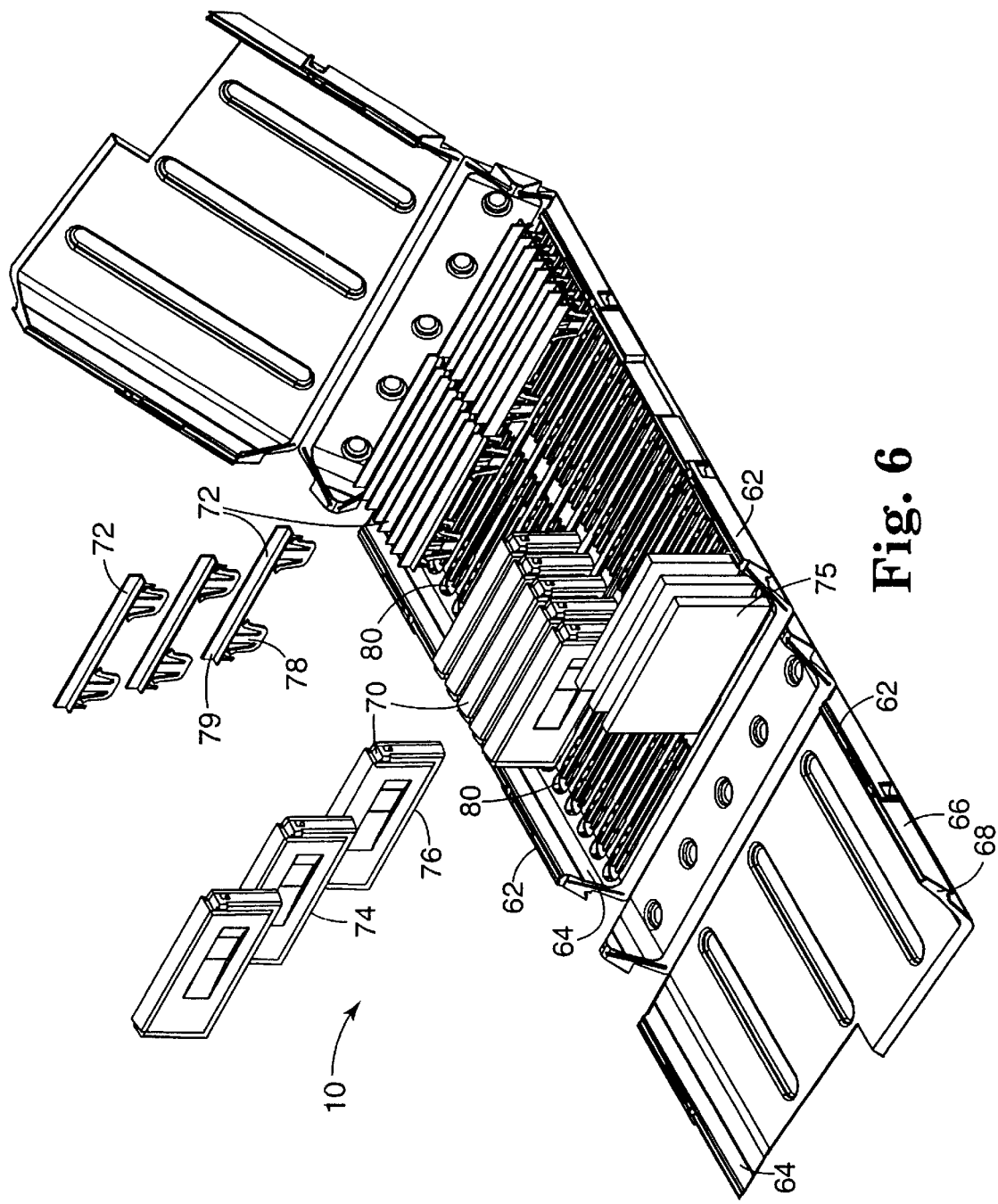
FIG. 6 is a perspective view of the container partially open.
Figure 7:
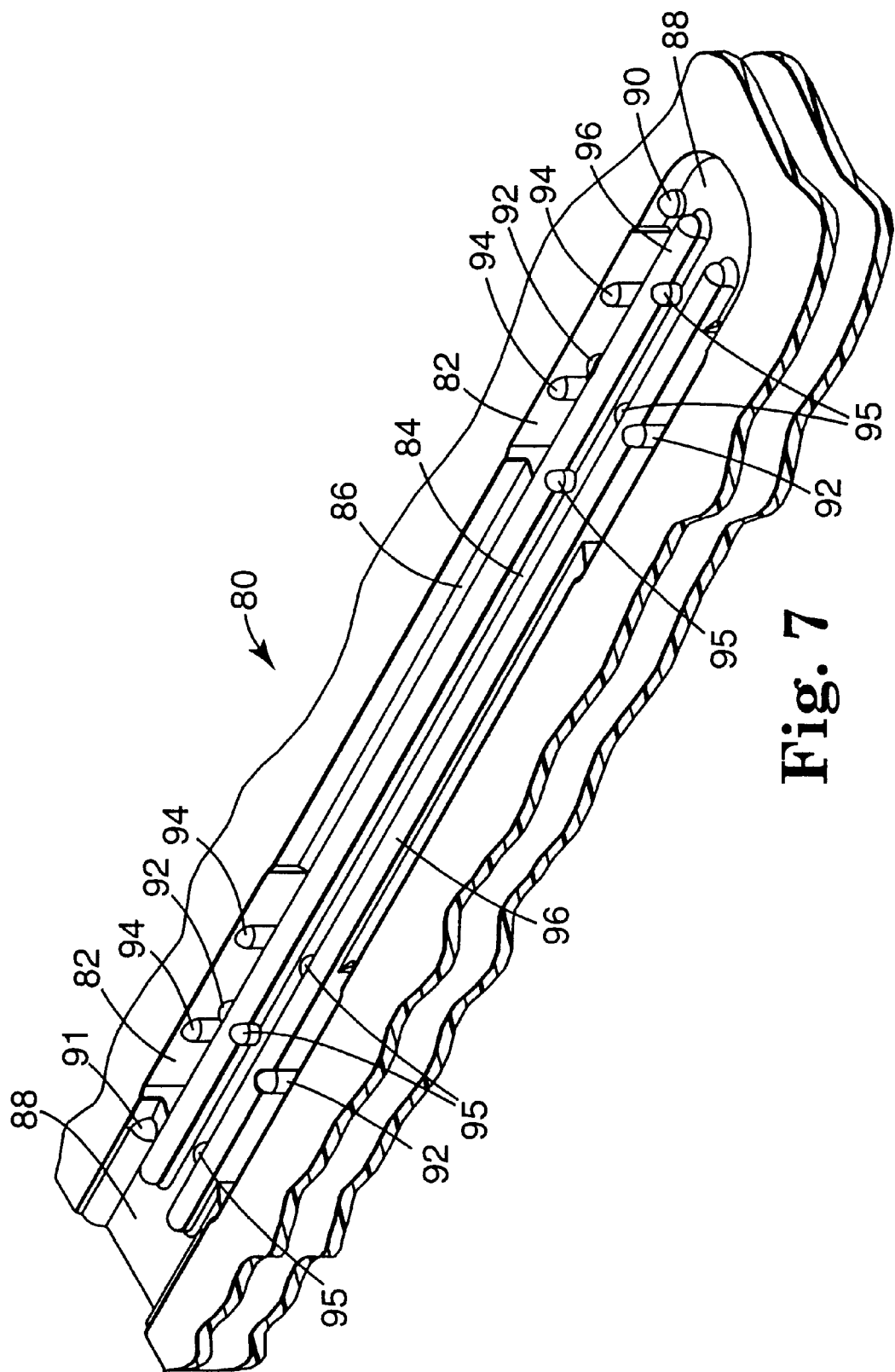
FIG. 7 is a partial perspective view of the base section of the container of FIG. 1.
Figure 8:
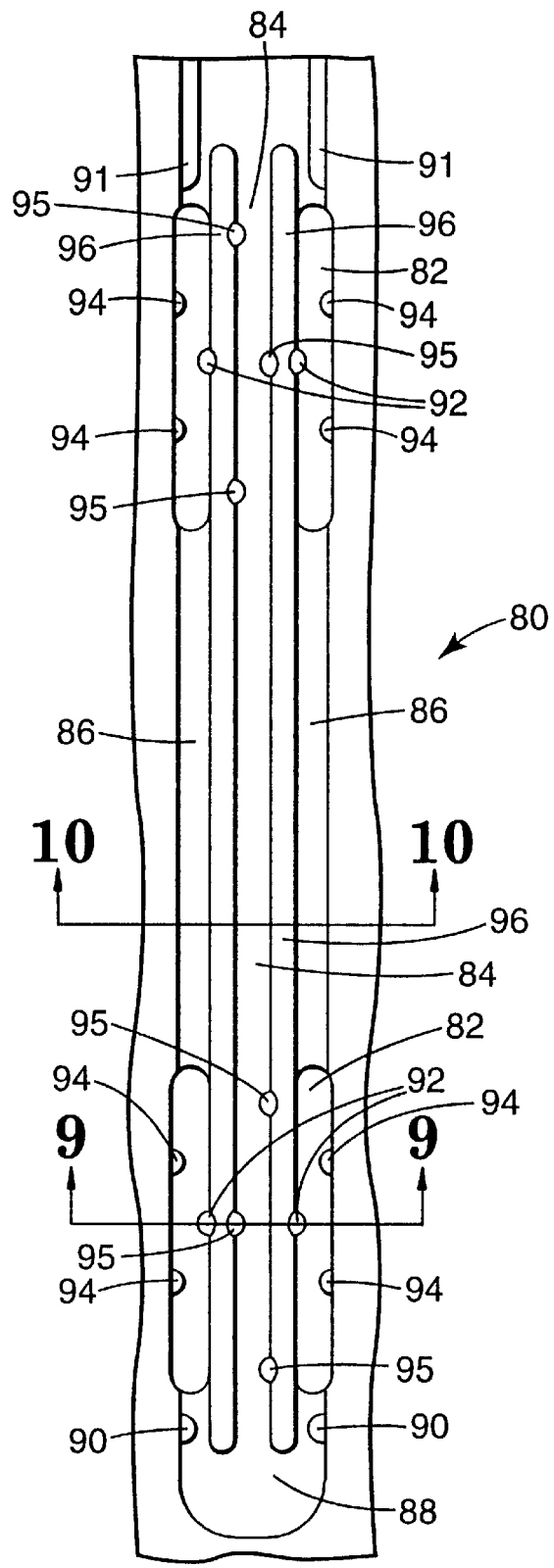
FIG. 8 is a partial top view of the base of FIG. 7.
Figure 9:
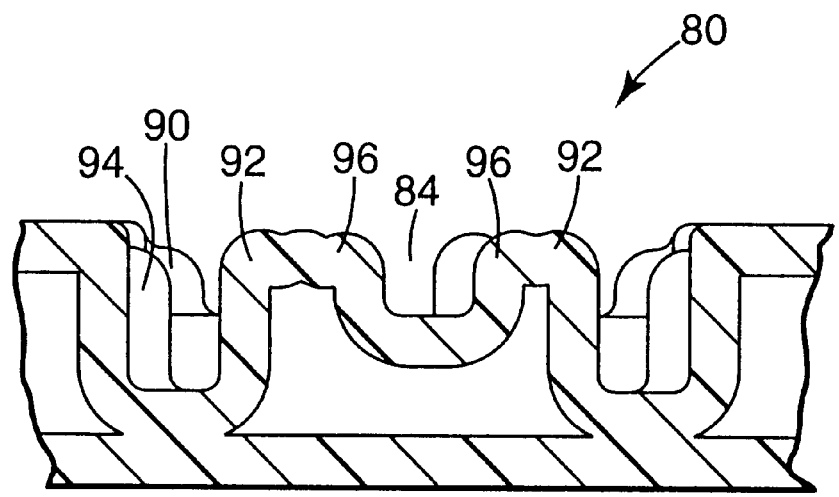
FIG. 9 is a cross-sectional view taken along line 9—9 of FIG. 8.
Figure 10:
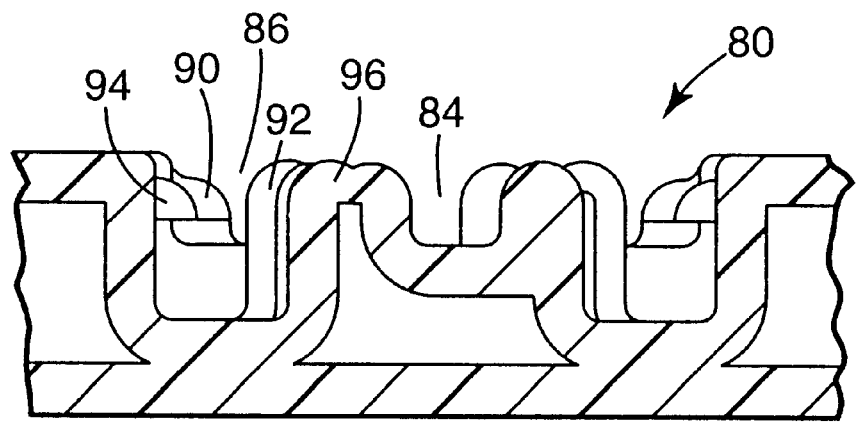
FIG. 10 is a cross-sectional view taken along line 10—10 of FIG. 8.

The container 10, best shown in FIGS. 1, 3, and 6, is a one-piece parallelepipedal container formed of five sections: a base section 12, first and second end sections 14, 16, and first and second cover sections 18, 20. Every section, because it is blow molded, is formed of an inner and an outer layer. This is shown in FIG. 9. The other figures show the inside of the inner layer and the outside of the outer layer. Throughout the application, the sections will be described generically.

The base section 12 forms the base of the container 10 and has opposing first and second ends 22, 24, opposing first and second sides 26, 28, an inner surface 30, and an outer surface 32. An end section 14, 16 is hinged to the base section 12, at the first and second ends 22, 24 of the base section 12. Each end section 14, 16 also has opposing first and second ends 34, 36, opposing first and second sides 38, 40, an inner surface 42, and an outer surface 44. The first end 34 of each end section 14, 16 is hinged to the respective first and second ends 22, 24 of the base section 12. The second end 36 of each end section 14, 16 is hingedly connected to a cover section 18, 20. Each cover section 18, 20 also has opposing first and second ends 46, 48, opposing first and second sides 50, 52, an inner surface 54, and an outer surface 56. The first end 46 of each cover section 18, 20 is connected to the second end 36 of the respective end section 14, 16. The second end 48 of each cover section 18, 20 is a free end and mates with the other cover section 20, 18 free end when the two cover sections 18, 20 combine to form the cover of the container 10, when the container is in the second condition.

In the illustrated embodiment, the cover sections 18, 20 are complementary. When the container 10 is closed, one half of the first cover section 18 (the half having the beveled surface 55) resides over the corresponding half of the second cover section 20 (the half having the beveled surface 57). The other half of the first cover section 19 (the half having the beveled surface 57) resides under the corresponding half of the second cover section 20 (the half having the beveled surface 55). This causes the cover sections 18, 20 to interlock. Other configurations can also be used. As shown, each cover section 18, 20 has a flap 58 and a recessed portion 60. The flap 58 of one cover section 18, 20 fits into the recessed portion 60 of the complementary cover section 20, 18. Beveled surface 55 mates with a complementary beveled surface 57 on the second end 48 of the cover sections 18, 20. When the container 10 is in the second folded condition, the base section 12, one of the first and second end sections 14, 16 and the respective cover sections 18, 20 mate together, as shown in FIG. 3. The ends of these sections matingly engage when the container 10 is formed by folding each end section 14, 16 at a right angle to the base section 12, and folding the cover sections 18, 20 at the right angles to each end section 14, 16, closing the container 10 when the interlocking flaps 58 and recessed portions 60 of the cover sections 18, 20 engage each other.

Each section 12, 14, 16, 18, 20 has a wall 62 extending approximately orthogonally from the inner surface 30, 42, 54 of the section along the opposing first and second sides 26, 28, 38, 40, 50, 52. The walls 62 combine to form the two side walls of the container 10 when the container is assembled in the second condition. On each side, the wall 62 on the first end 22 of the base section 12, the wall 62 on the first end section 14, and the wall 62 on the first cover section 18 combine; and the wall 62 on the second end 24 of the base section 12, the wall 62 on the second end section 16, and the wall 62 on the second cover section 20 combine.

Each wall 62 has an inner wall portion 64, an outer wall portion 66, and a free end 68. The angle of each inner wall portion 64 with the inner surface 30, 42, 54 of its respective section and the angle of the outer wall portion 66 with the outer surface 32, 44, 56 of its respective section differ to prevent frictional locking of containers 10 when flat containers in the first condition are stacked.

All of the ends 22, 24, 34, 36, 46, 48 of the sections and their walls 62 interlock to secure the container 10 together and to form seals to seal out dust and other contaminants. A rib can be formed on the free end of some of the walls and a complementary slot can be formed on the free end of the other of the walls. Corresponding ribs mate with corresponding slots on respective free ends of the walls when the container is in the second condition. Additionally, latches can be integrally molded as one piece with the container sections and used to further secure the sections together.

Figure 5:
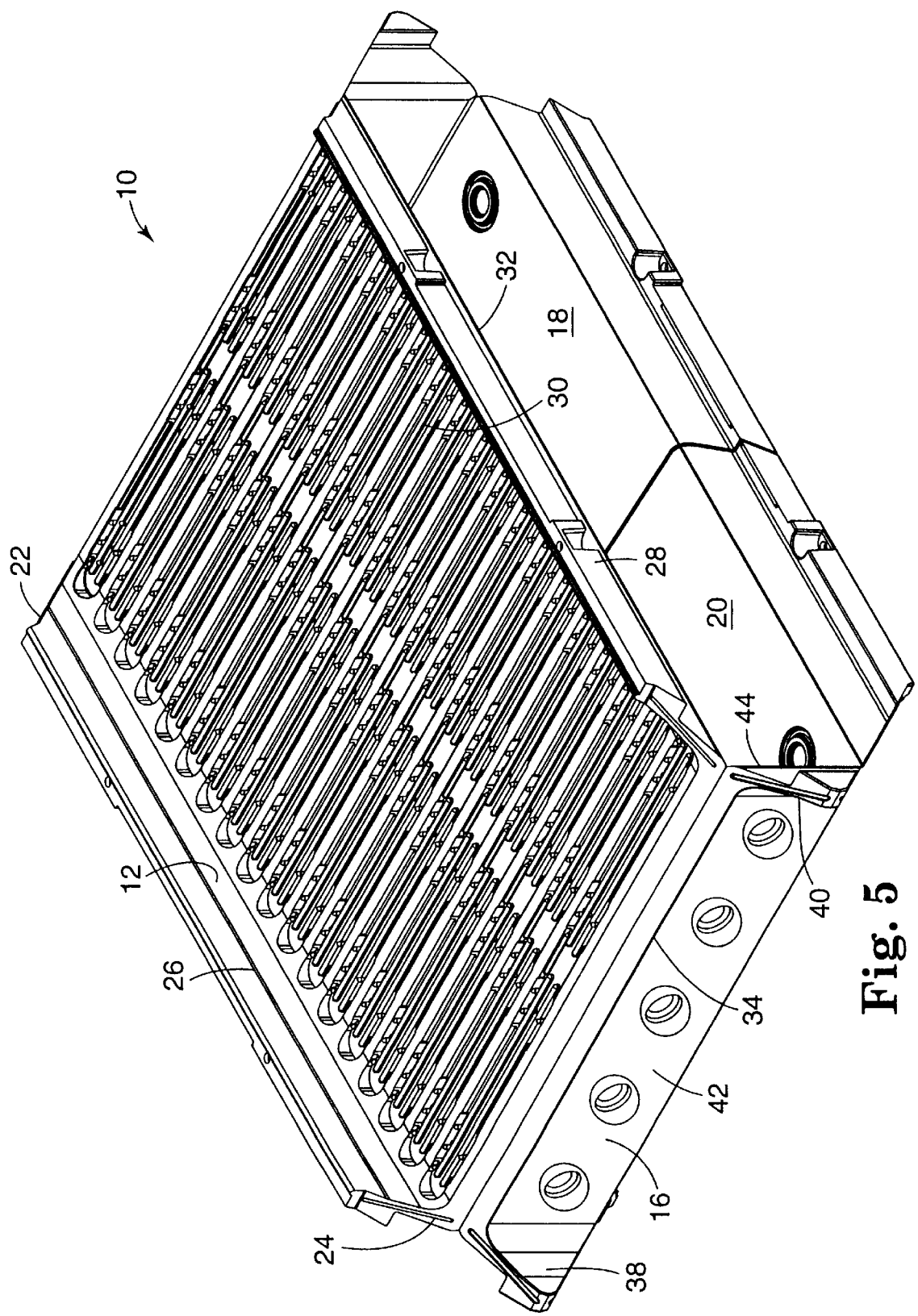
FIG. 5 is a perspective view of the container in a third condition.

All of the hinges in the illustrated embodiment are living hinges. Other hinges also can be used. The living hinge is a molded, flexible membrane hinge that allows the cover sections and end sections to fold completely under and out of the way of the base section for automated unloading of items from the container. The living hinges are arced or curved hinges which can be biased in either a flat 180° orientation in the first condition (FIGS. 1 and 2), in a 90° orientation in the second condition (FIGS. 3 and 4), or a flat, folded 360° orientation in the third condition (FIG. 5).

Tab-and-slot features (not shown) could be used in the edges to allow the respective container end sections and base section, and respective container end sections and cover sections to snap-fit into each other when the container is assembled. The end sections can be retained in the 90° orientation with the respective base section and cover sections using a tab and slot located adjacent the fold lines of the sections. The tab can be located on the beveled side of one of the end section and the base section and also on one of the end section and the cover section. The slot can be located on the beveled side of the other of the base section and the end section and also on the other of the cover section and the end section. The tab and slot can extend for substantially the entire length of the beveled side of the sections or can be discrete segments.

The container 10 has superior package densification to known containers. The container can be used to store and ship not only SEC cartridges 70, but skirts 72, shells 74, and PC boards 75 as well, without any modification to the container and without requiring extra components or inserts. (The cartridge 70 is a shell 74 with a skirt 72 and a PC board 75 inserted inside.) The known containers require 349.7 cm$^3$ (21.34 in$^3$) of space for each SEC cartridge stored. The container 10 requires only 270.4 cm$^3$ (16.5 in$^3$) per SEC. The container 10 can store 1.44 times as many SECs as the known containers. The container 10 holds thirty-six finished SEC cartridges, or thirty-six shells, or seventy-two skirts, or thirty-six PC boards. The currently-used containers hold only twenty-five of any of these.

Additionally, the container 10, when fully opened and flat, (in the first condition) is about half of the height of the container 10 when it is filled and closed. Its return densification is two times that of the current containers which do not fold flat for storage. Also, the container 10 is designed for maximum density on both U.S. and European shipping pallets. This allows the maximum number of containers, both assembled and unassembled, to be shipped in a given volume of space.

The container 10 includes slots 80 which receive and secure, using a friction fit, the SEC cartridges 70 and empty shells 74, skirts 72, and PC boards 75. The slots 80 are integrally formed as one piece with the base section 12, and are dimensioned to fit exactly each of these components 70, 72, 74, 75, with no dunnage, for tight, vibration-free shipping. And the same slots 80 can be used to receive and ship cartridges 70, shells 74, skirts 72, and PC boards 75 even though these articles have different sizes and different shapes. No dunnage is required for shipping any of these items. The container 10 can store, retain, and ship these articles separately or together in a single container. Different slots 80 can receive different articles within the same container at the same time.

FIGS. 7, 8, 9, and 10 show the inner surface 30 of the base section 12 of the container 10. Each slot 80 has the following features that hold cartridges 70, skirts 72, shells 74, and PC boards 75. Each slot 80 has a series of troughs 82, 84, 86, 88; retention columns 90, 92, 94, 95; and ridges 91, 96. Because the slot 80 is symmetrical about all of its central axes, features described for one end or one side of the slot 80 are found on all sides and all ends equally.

In the slot 80 retention columns 92, 94 are located in deep trough 82. Retention column 90 and ridge 91 are located in the shallow trough 88 and retention columns 92, 95 are located on the separation ridge 96. A central trough 84 is also part of the slot 80. A second shallow trough 86 lies between the two deep troughs 82. In use, the lower edge 76 of the SEC shell 74 is frictionally held in shallow troughs 86, 88 by retention columns 90, 92 and ridge 91 and rests upon the base of shallow troughs 86, 88. As can be seen from symmetry, the shell 74 can be held in either side of the slot 80, allowing the container 10 to be loaded from either direction and to be placed on an automatic loading and unloading device in any orientation.

The lower tab 78 of the skirt 72 is frictionally held in the deep trough 82 by retention columns 92, 94 at both ends of the slot 80. The slot 80 allows for retention of two skirts 72 per slot, on either side of the central trough 84. This increases the packing density of the container 10. Again, due to symmetry of both slot 80 and skirt 72, each skirt 72 can be inserted in any orientation; the skirt 72 can be held in the trough 86 by engaging the tab 79 between the columns 90 and 92 and ridge 91.

The PC board 75, which is a rectangular board, is received in the central trough 84 and is held in place by retention columns 95. One PC board 75 is retained in each trough 84.

When fully assembled, the SEC cartridge 70 includes one each of shell 74, skirt 72, and PC board 75, and can be inserted into and held firmly by the slot 80. In the assembled state, the cartridge 70 fits into the shallow troughs 86, 88 and its lower edge 76 is frictionally held by the retention columns 90, 92, and ridge 91, while the upper tabs 79 of the skirt 72 are frictionally held by the retention columns 92, 94. The skirt 72 is fixed in the shell 74 with the help of lower tabs 78. The assembled SEC 70 also includes a printed circuit board (not shown), having a wiring connector edge that fits in the shallow trough 84, between and protected from damage by extended ridges 96. Each slot 80 holds one assembled cartridge 70. Again, by symmetry, the assembled cartridge 70 can be inserted in the slot 80 in either orientation relative to the ends of container 10. Preferably, for maximum efficiency of automated loading and unloading, all cartridges 70 face the same direction.

The container can also have a plurality of stacking devices formed on both the inner and outer surfaces of the center and cover sections to permit many containers to be stacked, interlocked, and secured from relative lateral motion both when the containers are empty and flat in the first condition, as well as when the containers are assembled and filled with or empty of items in the second condition. Also, the container 10 can interface with automatic loading and unloading equipment used by cartridge manufacturers.

In the illustrated embodiment, the stacking devices includes at least one first positive locking member located on the outer surface of one of the base section and cover sections of the container. A first negative locking member is located at a location on the outer surface of the other of the cover sections and the base section of the container such that the first positive locking member and the first negative locking member mate when the container is in the second condition and is stacked base to cover. A second locking member is located on the inner surface of one of the base section and cover sections directly opposite the first locking members such that the second locking member mates with one of the first locking members when the container is in the first condition and is stacked flat, outer surface to inner surface. The second locking member is positive when it corresponds to and mates with a negative first locking member and the second locking member is negative when it corresponds to and mates with the a positive first locking member. Other variations of the locking members can be used. They can be various shapes and in various locations, and of any number.

The container 10 also includes a unique security and locking system. This system includes a security closure panel 100 which holds closed the container 10, has a label surface, and indicates whether the container has been tampered with or opened. The panel includes a flat outwardly-facing front side 102, to which shipping and return labels can be affixed. A shipping label can be adhered over a return label. After the container reaches its shipping destination, the outer shipping label can be removed to reveal the inner return label for returning the container, with or without product, for any reason. The panel 100 also has an opposing back side 104 which engages the base and cover sections 12, 18, 20 to hold closed the container 10. Additionally, the panel 100 includes break-away pins 106 that engage complementary aligned apertures or holes 108 molded into the sides of both the base and cover sections 12, 18, 20. The holes are formed in recesses 109 formed in the outer shelves 122, 124, described below. In order to remove the panel 100, the pins 106 must break. This indicates that the container 10 was opened or attempted to be opened. These features are described in more detail below.

Figure 11:
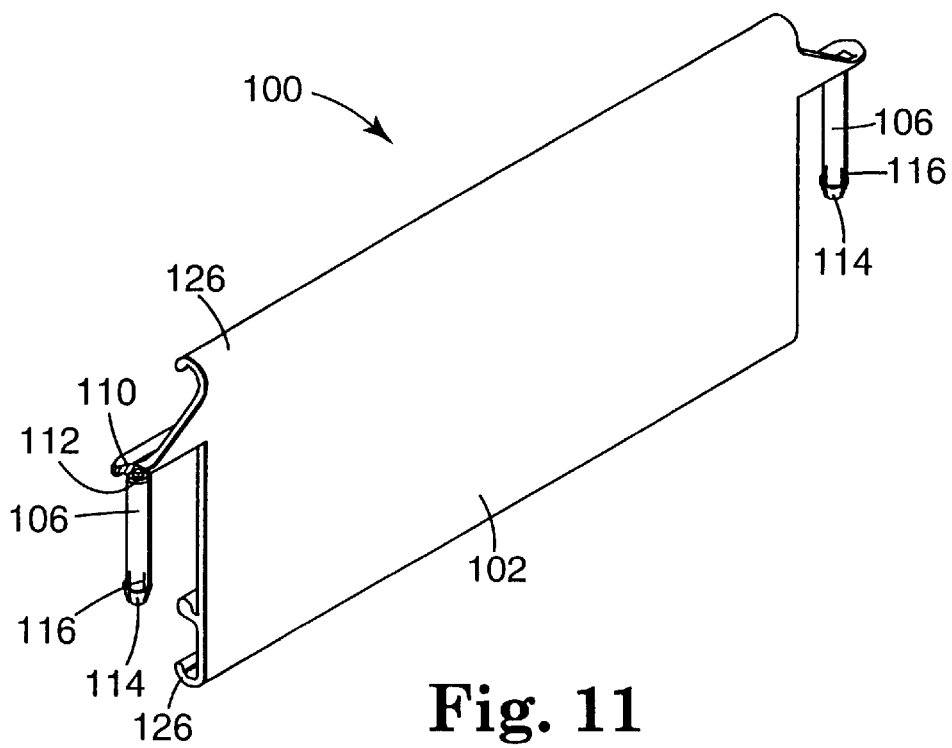
FIG. 11 is a perspective view of the front of a security closure panel for the container of FIG. 1.
Figure 12:
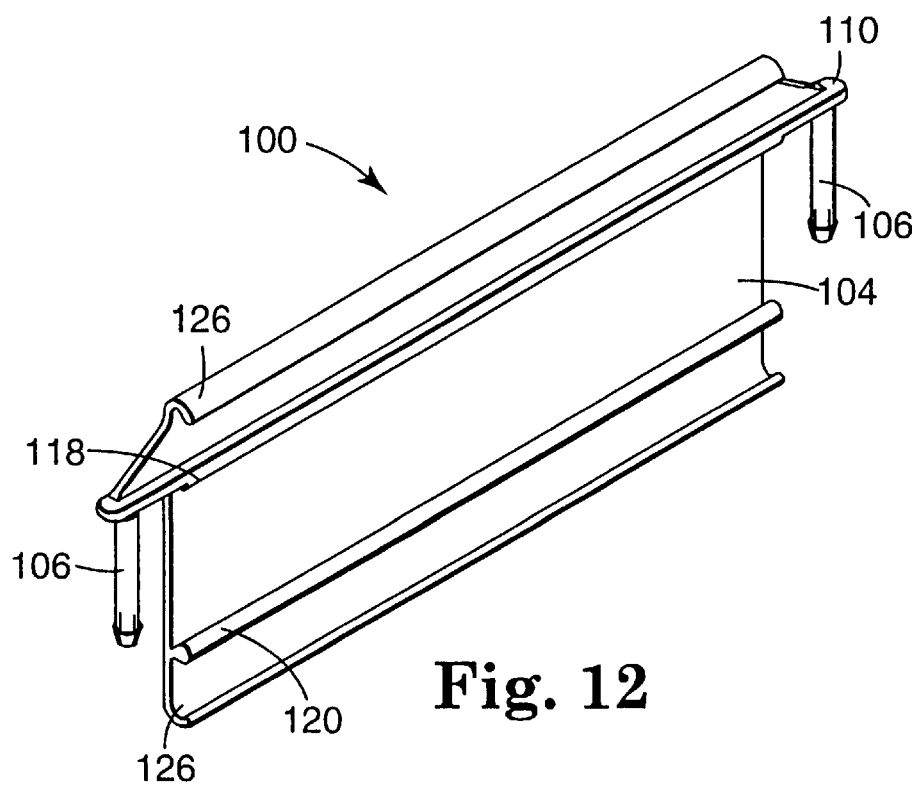
FIG. 12 is a perspective view of the back of the security closure panel of FIG. 11.
Figure 13:
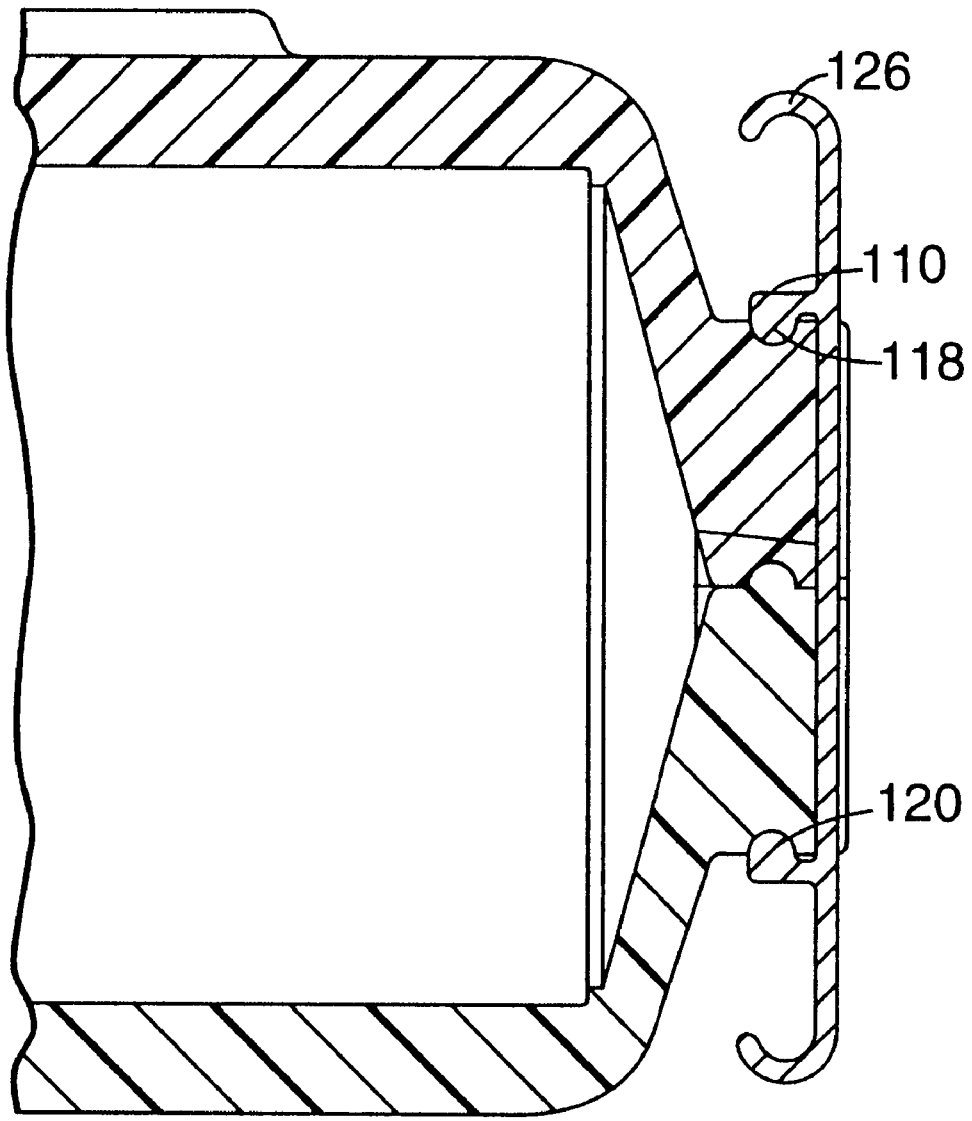
FIG. 13 is a cross-sectional view of the security closure panel of FIG. 11.

The security closure panel 100 is shown in detail in FIGS. 11, 12, and 13. The security closure panel 100 back side 104 includes a support rail 110 to which the securing pins 106 are affixed. In the illustrated embodiment the securing pins 106 each have a narrow attachment neck 112 and an enlarged head 114 on each end. The head 114 has slots 116 which permit deforming the head and reducing its outer diameter to permit the head to pass through the holes 108 on the container 10. Alternatively, other known systems for allowing a pin to pass through a hole without allowing it to be removed from the hole can be used.

In practice, the securing pins 106 extend through the aligned holes 108, which are formed in the base section 12 and the two cover sections 18, 20 of the container 10. To securely close the container 10 after the first and second cover sections 18, 20 have been closed, the securing pins 106 are inserted into the holes 108 and the security closure panel 100 is urged downward until the deformable, slotted, tapered pin heads 114 are forced through the holes 108. Because the diameter of the pin heads 114 is larger than the diameter of the apertures holes 108, the pin heads 114 must deform inwardly to pass through the holes 108. The slots 116 enable the inward deformation. After the pins 106 pass through the holes 108, the enlarged portion of the pin heads 114 resumes its resting diameter, preventing removal of the pins 106.

An upper fastening rail 118 and a lower fastening rail 120 are spaced apart on the back side of the security closure panel 100 at such a distance to deformably and frictionally engage with outer shelves 122 on each cover section 18, 20 and a complementary outer shelf 124 on the base section 12 of the container 10, as the pins 106 pass through their respective holes 108. Once in place, the security closure panel 100 cannot be removed without breaking the pins 106 at their narrow necks, thereby indicating that the security closure panel 100 has been tampered with or removed. The security closure panel 100 also has a gripping extension 126 on both its upper and lower ends. These gripping extensions 126 provide convenient gripping areas by which the security closure panel 100 can be removed in order to open the container 10 when appropriate.

The security closure panel can be used on either side of container and can be inserted from either direction, such that either fastening rail 118, 120 is engaged with the outer shelves 122 of the cover sections 18, 20 or engaged with the outer shelf 124 of the base section 12. The security closure panel 100 is symmetrical about its vertical centerline.

This container meets many customer, social, and environmental needs. The per use cost of the container is less than the currently-used corrugated cardboard containers and the container requires less labor to unpack. The container requires less storage space than current containers both when the container is set up and when it is unfolded. The container fits into current material handling systems and can be marked easily to identify the contents. Less waste is generated during the manufacture and use of this container and the container is stackable on pallets. The container is safer and easier to open than known containers. The container eliminates the need and expense of box sealing tapes and closures that frequently require using razor knives and other such instruments. By eliminating razor knives, fewer injuries and lacerations result from using the container.

The container is environmentally sound in that it is refillable, reusable, and recyclable. The container 10 is designed for up to five hundred uses before recycling is necessary. An appropriate material selection would permit regrinding and simple recycling of damaged or worn containers. Because the container can be made of material that can be ground up and recycled, there is no waste and no material to clog landfills. This is a vast improvement over the known containers which are discarded after a single use.

An optional additional feature on the container 10 is a condition monitor (not shown). Temperature monitors can be used; static dissipative changes can be recorded; and vibrations can be monitored; all using known technology.

The illustrated container is formed of a single piece, but it can also be formed of multiple components. For example, the base section, end sections, and cover sections can each be separate components or some can be separate from combinations of other sections. Individual sections also can be separated into portions. Also, the container can be formed in shapes other than parallelepipedal to be used for other components. This container is not limited to the shipping and storage of computer components. It can be used with other articles and can be designed to accommodate more than two differently sized and shaped articles.

We claim:

1. A storage container for storing and shipping items which is foldable between at least two conditions, a first flat unformed condition suitable for stacking and shipping empty containers and a second folded formed condition suitable for stacking and shipping loaded containers, the container comprising:

a base section having opposing first and second ends, opposing first and second sides, an inner surface, and an outer surface;

first and second end sections hinged to the first respective first and second ends of the base section, wherein each end section has opposing first and second ends, opposing first and second sides, an inner surface, and an outer surface, and the first end of each end section is hinged to the first respective first and second ends of the base section;

first and second cover sections hinged to the respective second ends of the end sections, wherein each cover section has opposing first and second ends, opposing first and second sides, an inner surface and an outer surface, a flap and a recessed portion, and the first end of each cover section is hinged to the second end of the respective end sections and the second end of each cover section is a free ened and matingly engages the other cover section free end when the container is in the second condition, the flap of one cover section fits into the recess of the other cover section, and the two cover sections combine to form the cover of the container;

means, integrally formed as one piece with the inner surface of the base section, for interlocking with and orientation-independently securing differently sized and shaped articles having different lengths and widths, wherein articles having a first size and shape can be stored in the same location of the inner surface of the base section as articles having a second size and shape; and wherein when the container is in the second folded condition, the base section, one of the first and second end sections, and the respective cover sections matingly engage each other to interlock when the container is formed by folding each end section at a right angle to the base section, and folding the cover sections at right angles to each end section, closing the container when the interlocking flaps and recess portions of the cover sections engage each other.

2. The container of claim 1 wherein each of the sections is formed with a wall extending approximately orthogonally along the opposing first and second sides to form side walls of the container when the container is in the second condition, wherein on each side, the wall on the first end of the base section, the wall on the first end portion, and the wall on the first cover portion combine; and the wall on the second end of the base section, the wall on the second end section, and the wall on the second cover section combine.

3. The container of claim 2 wherein each section has an inner surface from which the walls extend and an outer surface and each wall has an inner wall portion and an outer wall portion, wherein the angle of each inner wall portion with the inner surface of its respective section and the angle of the outer wall portion with the outer surface of its respective section differ to prevent frictional locking of containers when containers in the first condition are stacked.

4. The container of claim 2 wherein each wall has a free end, wherein the container further comprises means for securing the sections together along respective edges of the container walls to form a seal, the securing means comprising a rib formed on the free end of some of the walls and a complementary slot formed on the free end of the other of the walls, wherein corresponding ribs mate with corresponding slots on respective free ends of the walls when the container is in the second condition.

5. The container of claim 1 wherein the container is parallelepipedal and further comprising means for securing the sections together to form the container.

6. The container of claim 1 wherein the container is suitable for shipping computer components and the container is formed of plastic and is reusable hundreds of times.

7. The container of claim 1 wherein the container comprises a hollow double wall construction.

8. The container of claim 7 wherein the container is formed by a method selected from blow molding, injection molding, and twin sheet thermoforming.

9. The container of claim 7 wherein said hollow double walls further comprise blow holes.

10. A storage container for storing and shipping items which is foldable between at least two conditions, a first flat unformed condition suitable for stacking and shipping empty containers and a second folded formed condition suitable for stacking and shipping loaded containers, the container comprising:

a base section having opposing first and second ends, opposing first and second sides, an inner surface, and an outer surface;

first and second end sections hinged to the respective first and second ends of the base section, wherein each end section has opposing first and second ends, opposing first and second sides, an inner surface, and an outer surface, and the first end of each end section is hinged to the respective first and second ends of the base section;

first and second cover sections hinged to the respective second ends of the end sections, wherein each cover section has opposing first and second ends, opposing first and second sides, an inner surface and an outer surface, and the first end of each cover section is hinged to the second end of the respective end sections and the second end of each cover section is a free end and connects to the other cover section fee end when the container is in the second condition and the two cover sections combine to form the cover of the container; and means, integrally formed as one niece with the inner surface of the base section, for securing differently sized and shaped articles, wherein articles having a first size and shape can be stored in the same location of the inner surface of the base section as articles having a second size and shape, wherein the means for securing differently sized and shaped articles comprises slots having a set of outer walls forming a trough for receiving the articles having a first size and shape and for securing those articles using a friction fit, and a set of inner walls forming a trough for receiving the articles having a second size and shape and for securing these articles using a friction fit, wherein the first size is larger than the second size.

11. The container of claim 10 wherein each slot has a series of troughs, retention columns, and a ridge, and wherein the slot is symmetrical about all of its central axes.

12. The container of claim 10 wherein each slot comprises two deep troughs and a pair of retention columns located in the deep trough; a shallow trough and a retention column located in the shallow trough; a separation ridge and a retention column located on the separation ridge; and a central trough.

13. The container of claim 12 wherein each slot further comprises a second shallow trough between the two deep troughs, and retention columns located in the central trough.

14. A storage container for storing and shipping items which is foldable between at least two conditions, a first flat unformed condition suitable for stacking and shipping empty containers and a second folded formed condition suitable for stacking and shipping loaded containers, the container comprising:

a base section having opposing first and second ends, opposing first and second sides, an inner surface, and an outer surface;

first and second end sections hinged to the respective first and second ends of the base section, wherein each end section has opposing first and second ends, opposing first and second sides, an inner surface and an outer surface, and the first end of each end section is hinged to the respective first and second ends of the bas section;

first and second cover sections hinged to the respective second ends of the end sections, wherein each cover section has opposing first and second ends, opposing first and second sides, an inner surface and an outer surface, and the first end of each cover section is hinged to the second end of the respective end sections and the second end of each cover section is a free end and connects to the other cover section free end when the container is in the second condition and the two cover sections combine to form the cover of the container; and means, integrally formed as one piece with the inner surface of the base section, for securing differently sized and shaped articles, wherein articles having a first size and shape can be stored in the same location of the inner surface of the base section as articles having a second size and share;

means for indicating whether the container has been opened, the indicating means comprising:

indentations and holes located on the sides of both the center and cover sections;

a panel having a flat outwardly-racing section and an inner section having tabs that engage securely with the indentations; and break-away pins on both ends of the panel that engage the holes in the sides of the center and cover sections, wherein each pin has an enlarged head which passes through a respective hole and cannot be removed through the hole, and wherein when the panel is removed the pins break away from the panel and fall through the holes, thereby indicating that the container was tampered with.

* * * * *

UNITED STATES PATENT AND TRADEMARK OFFICE
CERTIFICATE OF CORRECTION

PATENT NO.: 6,053,346

DATED: April 25, 2000

INVENTOR(S): Gerald J. Niles, Paul A. Connors, John M. Darst

It is certified that error appears in the above-identified patent and that said Letters Patent is hereby corrected as shown below:

Col 6, line 28, "(orientation with the" should be -- orientation with the --.

Col. 10, line 18, "Section is a free ened and" should be -- Section is a free end and --.

Col. 11, line 35, "cover section fee end" should be -- cover section free end --.

Col. 11, line 48, "for securing those" should be -- for securing these --.

Signed and Sealed this

Twenty-second Day of May, 2001

Attest:

NICHOLAS P. GODICI

Attesting Officer     Acting Director of the United States Patent and Trademark Office